US011204886B2

(12) United States Patent
Roy et al.

(10) Patent No.: US 11,204,886 B2
(45) Date of Patent: Dec. 21, 2021

(54) MANAGEMENT OF ZONED STORAGE DRIVES

(71) Applicant: Western Digital Technologies, Inc., San Jose, CA (US)

(72) Inventors: Souvik Kumar Roy, Bangalore (IN); Sazid Mahammad, Bangalore (IN); Priya Lekkala Vishnu, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/452,522

(22) Filed: Jun. 25, 2019

(65) Prior Publication Data

US 2020/0409892 A1 Dec. 31, 2020

(51) Int. Cl.
*G06F 13/40* (2006.01)
*G06F 13/42* (2006.01)

(52) U.S. Cl.
CPC ...... *G06F 13/4027* (2013.01); *G06F 13/4221* (2013.01); *G06F 2213/0036* (2013.01)

(58) Field of Classification Search
CPC . G06F 3/4027; G06F 13/4221; G06F 13/4027
See application file for complete search history.

(56) References Cited

U.S. PATENT DOCUMENTS

| | | | |
|---|---|---|---|
| 6,470,382 B1 * | 10/2002 | Wang | H04L 29/12009 709/220 |
| 7,281,062 B1 | 10/2007 | Kuik et al. | |
| 8,117,385 B2 | 2/2012 | Benhase et al. | |
| 8,218,538 B1 | 7/2012 | Chidambaram et al. | |
| 8,631,133 B1 * | 1/2014 | Jonnala | H04L 67/1097 709/227 |
| 10,108,560 B1 | 10/2018 | Lamb et al. | |
| 2004/0078521 A1 * | 4/2004 | Hawks | G06F 3/0607 711/118 |
| 2005/0268043 A1 * | 12/2005 | Kitamura | G06F 11/142 711/131 |
| 2006/0218349 A1 * | 9/2006 | Oe | G06F 12/0866 711/118 |
| 2006/0277383 A1 | 12/2006 | Hayden et al. | |

(Continued)

FOREIGN PATENT DOCUMENTS

KR 1020150061314 A 6/2015

OTHER PUBLICATIONS

International Search Report and Written Opinion of Application No. PCT/US2020/019768, dated Sep. 7, 2020 (9 pages).

*Primary Examiner* — Tim T Vo
*Assistant Examiner* — Phong H Dang
(74) *Attorney, Agent, or Firm* — Patent Law Works LLP

(57) ABSTRACT

An example system includes an enclosure having a plurality of small computer system interface (SCSI) drives partitioned into a first zone including a first SCSI drive of the plurality of SCSI drives and a second zone including a second SCSI drive of the plurality of SCSI drives. The system includes a plurality of communication ports having a first port through which the first zone communicates; and a second port through which the second zone communicates. The system includes a management node configured to interact with the first SCSI drive in a first server as a first Internet SCSI (iSCSI) drive, and with the second SCSI drive in a second server as a second iSCSI drive.

20 Claims, 4 Drawing Sheets

(56) References Cited

U.S. PATENT DOCUMENTS

| | | | |
|---|---|---|---|
| 2008/0034067 A1* | 2/2008 | Islam | G06F 3/0605 |
| | | | 709/220 |
| 2011/0138136 A1* | 6/2011 | Shitomi | G06F 3/0644 |
| | | | 711/154 |
| 2011/0239213 A1 | 9/2011 | Aswani et al. | |
| 2012/0109958 A1* | 5/2012 | Thakur | G06F 16/122 |
| | | | 707/737 |
| 2012/0331181 A1 | 12/2012 | Govande et al. | |
| 2013/0007306 A1 | 1/2013 | Myrah et al. | |
| 2014/0032960 A1* | 1/2014 | Konishi | G06F 11/1456 |
| | | | 714/6.3 |
| 2018/0136957 A1* | 5/2018 | Guo | H04L 63/0428 |

* cited by examiner

MANAGEMENT OF ZONED STORAGE DRIVES

TECHNICAL FIELD

The present disclosure generally relates to data storage, and in a more particular example, to management of data storage systems.

BACKGROUND

Data storage devices may be packaged or arranged in an enclosure. The enclosure may include many storage devices configured for storing electronic data. The storage devices may take the form of hard drives and may, more specifically, be configured as storage devices that conform to one or more standards. One computer interface includes the small computer system interface (SCSI).

Storage devices configured as SCSI devices may be populated in a SCSI enclosure. A SCSI enclosure may include connector ports for interfacing with external systems or servers.

Portions of the individual SCSI devices may be grouped or aggregated into "zones" with each zone providing dedicated storage to a respective system or server. Assigning specific storage devices into zones and restricting connected servers to only be able to access the subset of drives assigned to their zone provides security to the other drives in the enclosure.

Since the drives in the enclosure need to be managed by the provider of the enclosure for purposes such as firmware upgrades and support bundle generation, such activities require management functionality (e.g., a management stack) in each of the servers to monitor the subset of drives in their respective zones. In such a configuration, results from the individual monitoring of the different servers would then need to be aggregated or otherwise interfaced with an out-of-band management stack. Burdening servers with additional management responsibilities and support of management stacks is undesirable.

SUMMARY

Various innovative aspects related to manage SCSI drives. According, to one innovative aspect, a system may comprise an enclosure including: a plurality of small SCSI drives partitioned into a first zone including a first SCSI drive of the plurality of SCSI drives and a second zone including a second SCSI drive of the plurality of SCSI drives; and a plurality of communication ports. The plurality of communication ports includes a first port through which the first zone communicates, and a second port through which the second zone communicates. The enclosure further includes a node configured to interact with the first SCSI drive in the first zone as a first Internet SCSI (iSCSI) drive, and with the second SCSI drive in the second zone as a second iSCSI drive.

In this and other implementations, a first server is configured to expose the first SCSI drive as the first iSCSI drive, and a second server is configured to expose the second SCSI drive as the second iSCSI drive. Also, the first and second SCSI drives may be respectively physical SCSI drives to the first and second servers, and the first and second SCSI drives may be respectively iSCSI drives to the management node. Further, the first server may communicate with the first SCSI drive over a first serially attached SCSI (SAS) port of the enclosure, and the second server may communicate with the second SCSI drive over a second SAS port of the enclosure. The first and second SCSI drives are respectively physical SCSI drives to the first and second servers, and the first and second servers are each further configured to include iSCSI targets for each of the SCSI drives. The management node may be further configured as an iSCSI initiator. Also, the management node may further include a respective plurality of instances of the plurality of SCSI drives. A management module stack for managing the plurality of SCSI drives in an enclosure resides on the management node.

According to another innovative aspects, a method may include partitioning a plurality of SCSI drives into a first zone including a first SCSI drive of the plurality of SCSI drives and a second zone including a second SCSI drive of the plurality of SCSI drives; communicating with the first and second zones through respective first and second ports; and interacting from a management node with the first SCSI drive in the first zone as a first iSCSI drive, and with the second SCSI drive in the second zone as a second iSCSI drive.

The method may include exposing by a first server the first SCSI drive as the first iSCSI drive; and exposing by a second server the second SCSI drive as the second iSCSI drive. The method yet further may include the first and second SCSI drives being respectively physical SCSI drives to the first and second servers, and the first and second SCSI drives being respectively iSCSI drives to the management node. The method may further include communicating between the first server and the first SCSI drive over a first serially attached SCSI (SAS) port of the enclosure, and communicating between the second server and the second SCSI drive over a second SAS port of the enclosure. Also, the first and second SCSI drives may be respectively physical SCSI drives to the first and second servers, and the first and second servers are each further configured as an iSCSI target. Also, the management node may be further configured as an iSCSI initiator. The management node further includes a respective plurality of instances of the plurality of SCSI drives. Also, a management module stack for managing the plurality of SCSI drives in an enclosure resides solely on the management node.

According to another innovative aspect, a system may include means for partitioning a plurality of SCSI drives into a first zone including a first SCSI drive of the plurality of SCSI drives and a second zone including a second SCSI drive of the plurality of SCSI drives; means for communicating with the first and second zones through respective first and second ports; and means for interacting from a management node with the first SCSI drive in the first zone as a first iSCSI drive, and with the second SCSI drive in the second zone as a second iSCSI drive.

These or other implementations may include one or more the following features. Means for exposing by a first server the first SCSI drive as the first iSCSI drive; and means for exposing by a second server the second SCSI drive as the second iSCSI drive. Also, the first and second SCSI drives may be respectively physical SCSI drives to the first and second servers, and the first and second SCSI drives are respectively iSCSI drives to the management node. The system may further include means for communicating between the first server and the first SCSI drive over a first SAS port of the enclosure, and means for communicating between the second server and the second SCSI drive over a second SAS port of the enclosure.

Accordingly, the embodiments disclosed herein provide various improvements for managing storage networks and/or storage systems.

DETAILED DESCRIPTION

Systems, methods, apparatuses, and other aspects are provided for allowing a management stack which is generally used for managing directly attached devices, to be repurposed to manage SCSI drives within an enclosure that are otherwise segregated by zoning and connectivity. Accordingly, the servers that support the zones do not need to be modified in order to provide management of the devices from a single node.

Conventionally, enclosures may have included a management port, compatible with either a wired or wireless protocol. The conventional management port would then be connected to a dedicated management system that runs a conventional management module. Such a configuration may be thought of as an 'out-of-band' approach. Such an approach, however, required dedicated connections and hardware near the enclosure.

Alternative conventional management approaches were performed 'in-band' where a management agent would operate within each server or zone and then communicate with a master management node that would aggregate the performance data from each of the servers operating a zone of SCSI drives. Such an approach requires the servers to support dedicated management module and be proprietarily configured. As can be readily determined, encumbering SCSI enclosures or servers supporting a zone of SCSI drives, is undesirable.

Figure 1:
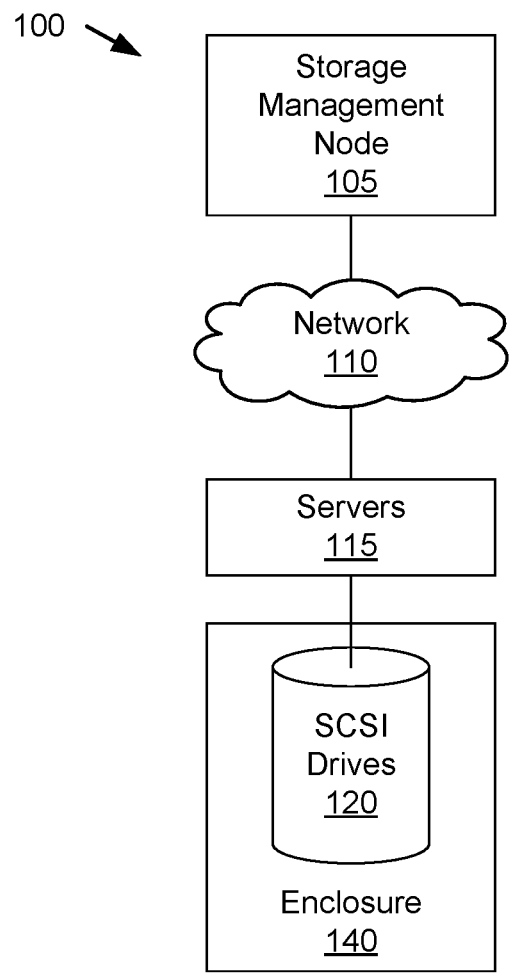
FIG. 1 illustrates an example storage management system for monitoring SCSI drives.

FIG. 1 illustrates a storage management system 100 for monitoring SCSI drives without requiring proprietary modifications to servers and SCSI enclosures. The storage management system 100 includes one or more enclosures 140 populated with a plurality of SCSI devices, such as SCSI drives 120.

The storage management system 100 further includes a plurality of servers 115 which utilize the storage capabilities of the plurality of SCSI drives 120. Each of the servers 115 may utilize a group or "zone" of the plurality of SCSI drives 120, resident within the enclosure 140, to perform their requisite operations. The servers 115 may connect to the zones of the plurality of SCSI drives 120 through ports, such as SAS ports, further described below.

The storage management system 100 further includes a storage management node 105 coupled to the servers 115 via a network 110. Storage management node 105 provides a storage management solution for managing a plurality of SCSI drives that have been grouped into zones. Storage management node 105, as further described below, provides a management solution without requiring modification or customization of the servers 115 or the plurality of SCSI drives 120 in the enclosure 140.

Figure 2:
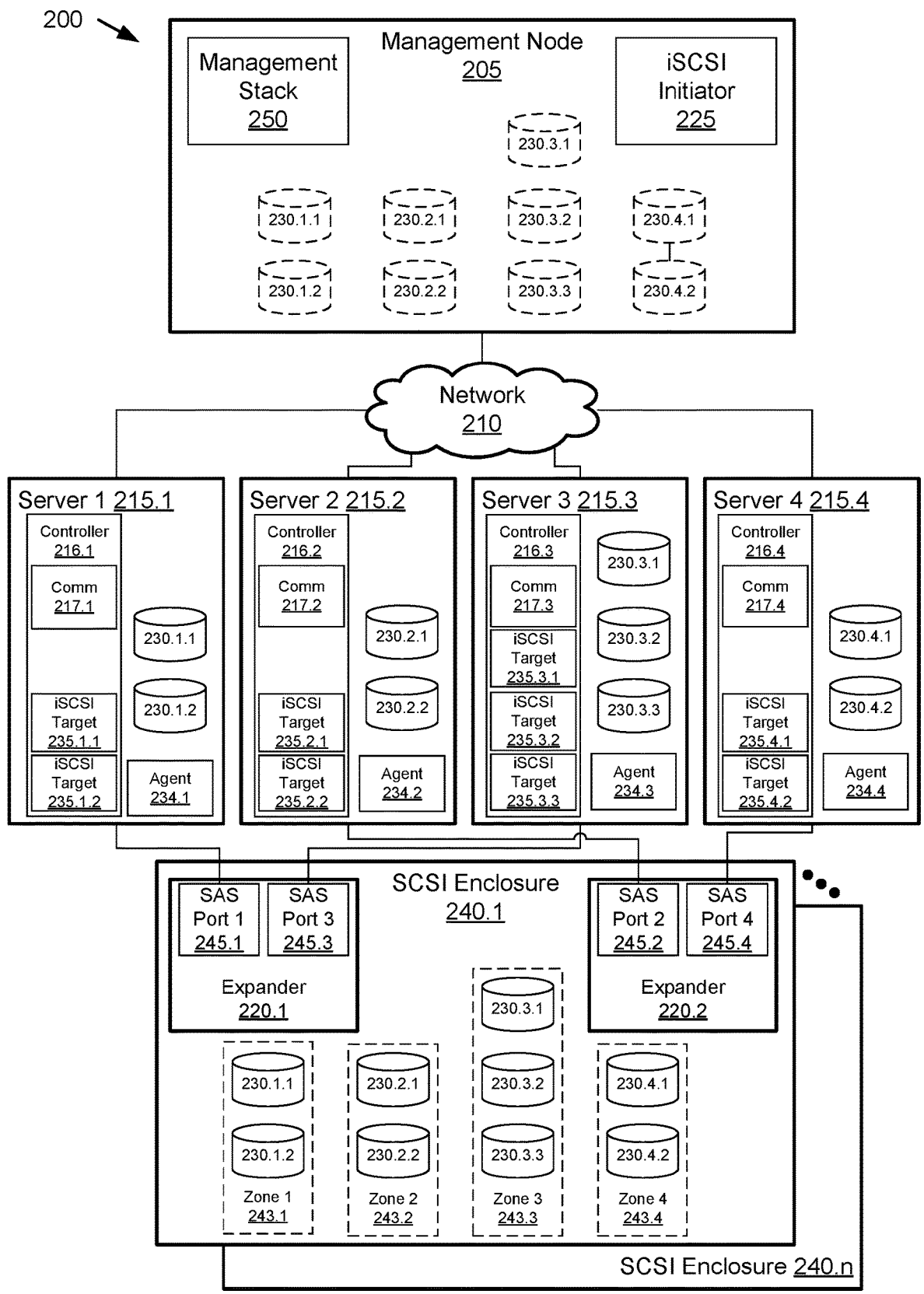
FIG. 2 illustrates a detailed block diagram of an example storage management system.

FIG. 2 illustrates a detailed block diagram of a storage management system 200. Storage management system 200 provides a storage management solution for managing SCSI enclosures and SCSI drives connected in zoned environments which provide access restriction from SCSI drives in adjacent zones.

Storage management system 200 includes a plurality of SCSI drives 230 located within an enclosure 240. The plurality of SCSI drives 230 may be a collection of drives configured from disks or solid-state storage. While the plurality of SCSI drives 230 in enclosure 240 may be illustrated and numbered to indicate groupings or zones, the plurality of SCSI drives 230 in enclosure 240 are generic with respect to each other. Further, the illustrated quantity of SCSI drives 230 in enclosure 240 is not to be considered as limiting. It is also noted that extensions to the reference numbers have been assigned to the individual SCSI drives to indicate an assigned "zone" and an identifier of a SCSI drive within the zone. Additionally, the storage management system 200 may be extendable to include multiple SCSI enclosures 240.$n$.

SCSI enclosure 240 further includes one or more expanders 220 which are devices that allow a user to expand the capabilities of a SCSI bus for applications such as mixing single-ended and differential interfaces, extending cable lengths to greater distances, and cascading together more devices.

The expanders 220 may each include two or more serially attached SCSI (SAS) ports 245. Each SAS port in a SAS domain has a SCSI port identifier that identifies the port uniquely within the SAS domain, i.e., the World Wide Name, and is generally assigned by the device manufacturer, much like an Ethernet device's MAC address, and is typically worldwide unique as well. SAS ports may use these port identifiers to address communications with each other.

FIG. 2 illustrates two expanders 220.1-220.2. Each expander includes two ports, with expander 220.1 including SAS port 1 245.1 and SAS port 3 245.3. Further, expander 220.2 includes SAS port 245.2 and SAS port 245.4. The numbering on the SAS ports is merely illustrative of groupings or zones of ones of the plurality of SCSI drives 230 that are communicated through the respective ports.

The storage management system 200 further includes a plurality of systems or servers 215 which provide specific services to users or other systems. The servers 215, examples of which are illustrated as servers 215.1-215.4, include respective controllers 216.1-216.4 for providing control of the server operations. Specifically, the controllers 216.1-216.4 include respective communication processes 217.1-217.4 for providing operations for a plurality of SCSI drives from a respective zone one or more SCSI drives, and for providing operations and means for communicating with the first and second SCSI drives through respective first and second ports.

The communication process 217.1 provides operations and means for communicating between the first server and the first SCSI drive over a SAS port of the enclosure. Further, the z communication process 217.2 provides operations and means for communicating between the second server and the second SCSI drive over a second SAS port of the enclosure.

The specifics of the services performed by the servers 215 is not further described herein other than to note that each of the servers 215 utilizes storage services from ones of the plurality of SCSI drives 230 that are grouped into a zone 243 that is independent of other zones of SCSI drives 230.

A first server, server 1, is denoted as server 215.1 and includes storage services supported by SCSI drive 230.1.1 and SCSI drive 230.1.2, which are both from a first zone, denoted as zone 243.1. Server 215.1 couples to SCSI enclosure 240 via SAS port 245.1 in expander 220.1 to provide the storage services provided by SCSI drive 230.1.1 and SCSI drive 230.1.2 physically located within the SCSI enclosure 240.

A second server, server 2, is denoted as server 215.2 and includes storage services supported by SCSI drive 230.2.1 and SCSI drive 230.2.2, which are both from a second zone, denoted as zone 243.2. Server 215.2 couples to SCSI enclosure 240 via SAS port 245.2 in expander 220.2 to provide the storage services provided by SCSI drive 230.2.1 and SCSI drive 230.2.2 physically located within the SCSI enclosure 240.

A third server, server 3, is denoted as server 215.3 and includes storage services supported by SCSI drive 230.3.1, SCSI drive 230.3.2, and SCSI drive 230.3.3, which are all from a third zone, denoted as zone 243.3. Server 215.3 couples to SCSI enclosure 240 via SAS port 245.3 in expander 220.1 to provide the storage services provided by SCSI drive 230.3.1, SCSI drive 230.3.2, and SCSI drive 230.3.3 physically located within the SCSI enclosure 240.

A fourth server, server 4, is denoted as server 215.4 and includes storage services supported by SCSI drive 230.4.1, and SCSI drive 230.4.2, which are both from a fourth zone, denoted as zone 243.4. Server 215.4 couples to SCSI enclosure 240 via SAS port 245.4 in expander 220.2 to provide the storage services provided by SCSI drive 230.4.1, and SCSI drive 230.4.2 physically located within the SCSI enclosure 240.

In accordance with embodiments, the servers 215 of the storage management system 200 are each further configured to expose their SCSI drives 230 thereby allowing another system via a network 210, such as management node 205, to create instances of the SCSI drives from each of the zones. Specifically, each server 215 includes an agent 234 for creating the iSCSI targets 235 for the SCSI drive 230.

More specifically and by way of example, server 1 215.1 includes an agent 234.1 for creating the iSCSI target 235.1 configured to expose SCSI drive 230.1.1 and SCSI drive 230.1.2 as storage resources for an iSCSI initiator, such as an iSCSI initiator 225. The iSCSI target 235.1 may provide operations and a means for exposing at a first server the first SCSI drive as the first iSCSI drive.

Similarly, server 2 215.2 includes an agent 234.2 for creating the iSCSI target 235.2 configured to expose SCSI drive 230.2.1 and SCSI drive 230.2.2 as storage resources for an iSCSI initiator, such as an iSCSI initiator 225. The iSCSI target 235.2 may provide operations and a means for exposing at a second server the second SCSI drive as the second iSCSI drive.

Also, server 3 215.3 includes an agent 234.3 for creating the iSCSI target 235.3 configured to expose SCSI drive 230.3.1, SCSI drive 230.3.2, and SCSI drive 230.3.3 as storage resources for an iSCSI initiator, such as an iSCSI initiator 225.

Further, server 4 215.4 includes an agent 234.4 for creating the iSCSI target 235.4 configured to expose SCSI drive 230.4.1 and SCSI drive 230.4.2 as storage resources for an iSCSI initiator, such as an iSCSI initiator 225.

Management node 205 includes an iSCSI initiator 225 which functions as an iSCSI client. The iSCSI initiator 225 operates to provide an instantiation of the SCSI drives 230 from their respective zones 243 into the management node 205. The iSCSI initiator 225 allows the management node 225 to be configured as an iSCSI initiator. For example, the iSCSI initiator 225 provides operations and a means for interacting from a management node with a first SCSI drive from a first zone as a first Internet SCSI (iSCSI) drive, and with a second SCSI drive from a second zone as a second iSCSI drive. The instantiations of SCSI drives 230 in the management node 205 are illustrated in FIG. 2 using dashed lines. The iSCSI initiator 225 initiates communications with the respective SCSI drives 230 by communicating using SCSI commands over an IP network, for example, such as network 210.

The management node 205 further includes a management stack module 250 which provides suitable management features and functions to SCSI drives 230. The iSCSI initiator 225 runs alongside the management stack module 250 which is connected to each of the SCSI drives 230 via an IP network 210. Management node 205 includes the entire management stack module 250 without requiring other established or commercially available servers or enclosures to be modified to accommodate a management function of zoned SCSI drives.

As illustrated in FIG. 2, a SCSI enclosure 240 comprises multiple SCSI devices such as SCSI drives 230 and expanders 220, and further includes several connector ports, such as SAS ports 245. The SCSI drives can also have multiple SAS ports. The access to the SCSI drives 230 may be segregated by a zoning configuration, such as zones 243 within enclosure 240. A particular server 215 will only have operational visibility to a particular number of SCSI drives, even though a particular server may be connected to the entire enclosure. Such an architecture enables the management node to have visibility to each of the nodes in the enclosure. Such connectivity enables multiple management functions including firmware/software updates, and support bundle collection.

The storage management system 200 may be configured from a software or module perspective to include three software layers—an application programming interface (API) layer, a device information layer, and a device access layer. The API layer may include routines and recipes for performing a high-level management function and may use the other two layers to call one or more getter/setter APIs, for example, to perform SCSI drive management operations. The device information layer usually provides the required information by using device access layer getter APIs. The device access layer may be the layer that communicates with the devices via SCSI protocol and also discovers the attached SCSI devices on that system node.

From a device firmware operation and per SCSI specifications, the SCSI devices have at least SCSI generic device commands to support and/or specific functional device support like SCSI block device commands. Depending on the implementation, firmware may or may not entertain all required manageability functionalities through the SCSI Generic Interface itself.

Accordingly, the disclosed storage management system 200 may run software forming a management stack module 250 in only one host, such as management node 205, and run agents 234 to create an iSCSI target 235 on each of the servers 215, with the iSCSI initiator 225 running on the management node 205. Further, the management node may support management functions through the management stack module 250 using, for example, management functions through firmware executing the SCSI Generic Interface.

The iSCSI target 235 may be configured through, for example, an installer. An installer (not shown) may install an agent 234 on the server 215 with the agents 234 creating the iSCSI targets 235 for the SCSI drive 230 to expose any required SCSI generic interfaces as the iSCSI targets where an iSCSI qualified name (IQN) string contains some specific system node information like a system node host name, and SCSI generic device name for traceability from the management node. Since the system may have multiple module components and configuration, an installer, not shown, may be preferred over, for example, a manual installation. An installer may be fed with the system node access credentials and proper permission to install the module.

In operation, the SCSI enclosure 240 of the storage management system 200 may be populated with a plurality of SCSI drives 230. The SCSI enclosure 240 further includes expanders 220 with a SAS port 245 for each zone 243. Each of the SAS ports 245 only expose the SCSI drives 230 in the respective zone 243 of the server 215. Hence, server 1 215.1 can only see or have visibility to SCSI drives 230.1.1 and 230.1.2. Similarly, server 2 215.2 can only see or have visibility to SCSI drives 230.2.1 and 230.2.2. Also, server 3 215.3 can only see or have visibility to SCSI drives 230.3.1, 230.3.2, and 230.3.3. Further, server 4 215.4 can only see or have visibility to SCSI drives 230.4.1 and 230.4.2.

The servers 215 may each operate an iSCSI target 235 configured to expose the SCSI drives 230 in the respective zones 243 of the enclosure using iSCSI targets. The servers may be configured to dynamically create or delete iSCSI targets in the case of 'hot' plug-in or plug-out.

The management stack module 250 may be operative on the management node 205 and may be connected with each of the servers 215. The iSCSI initiator 225 may periodically poll for new devices in the cluster of SCSI drives 230. If the iSCSI initiator 225 discovers a matching target SCSI drive 230, then the management node 205 accepts the SCSI drive and communicates over the device access layer. Since the target SCSI drive now has a generic SCSI drive instance in the management node, the device access layer will be able to work with a SCSI drive instance like any other directly attached drive.

Figure 3:
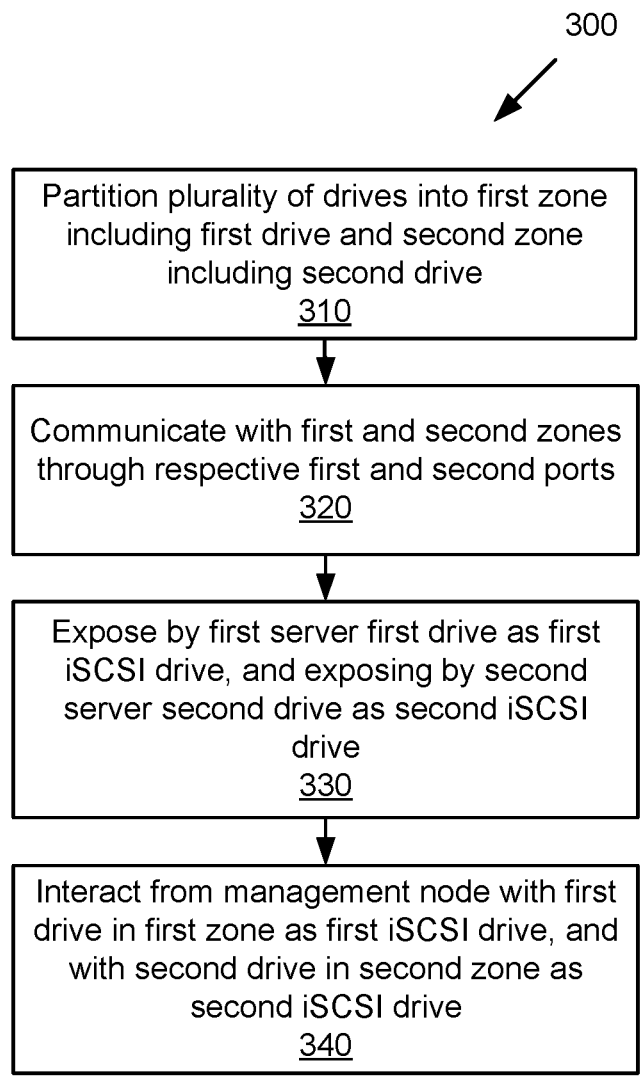
FIG. 3 illustrates a flowchart of an example method for managing a plurality of drives in an enclosure that are segregated into zones.

FIG. 3 illustrates a flowchart of a method 300 for managing a plurality of drives in an enclosure that are segregated into zones of drives.

In a block 310, a plurality of drives (SCSI drives) is partitioned or segregated into a plurality of zones. The plurality of drives provides a pool of drives from which ones are selected to provide storage services to a respective server as described above. Each of the servers is access-restricted from interacting with ones of the plurality of drives that are external to that zone. In one embodiment, first and second drives are respectively physical drives (SCSI drives) to the first and second servers, and the first and second drives are respectively network interface (iSCSI) drives to the management node. While the examples herein are described with respect to SCSI and iSCSI drives, it should be understood that other applicable interface protocols are applicable and encompassed hereby.

In a block 320, the ones of the plurality of SCSI drives assigned to the zone accessed by a specific server may communicate with the server via respective ports. In one example, a first server including SCSI drives from a first zone, communicates via a first port of the enclosure, and a second server including SCSI drives from a second zone, communicates via a second port of the enclosure.

In a block 330, a server includes an iSCSI target configured to expose the SCSI drives as iSCSI drives. In one example, a first server exposes a first SCSI drive as a first iSCSI drive, and a second server exposes a second SCSI drive as a second iSCSI drive. In the disclosed embodiments, the first and second SCSI drives are respectively physical SCSI drives to the first and second servers, and the first and second SCSI drives are respectively iSCSI drives to the management node. In one embodiment, the first and second SCSI drives are respectively physical SCSI drives to the first and second servers, and the first and second servers are each further configured to include an iSCSI target.

In a block 340, a management node interacts with a SCSI drive as if it were an iSCSI drive. Specifically, in one example, the management node interacts with a first SCSI drive from a first zone as a first iSCSI drive, and interacts with a second SCSI drive from a second zone as a second iSCSI drive.

In one embodiment, the management node communicates between the first server and the first SCSI drive over a first serially attached SCSI (SAS) port of the enclosure, and the management node communicates between the second server and the second SCSI drive over a second SAS port of the enclosure. In another embodiment, the management node is further configured to include an iSCSI initiator. In yet another embodiment, the management node further includes a respective plurality of instances of the plurality of SCSI drives. In yet a further embodiment, a management module stack for managing the plurality of SCSI drives in an enclosure resides solely on the management node.

Figure 4:
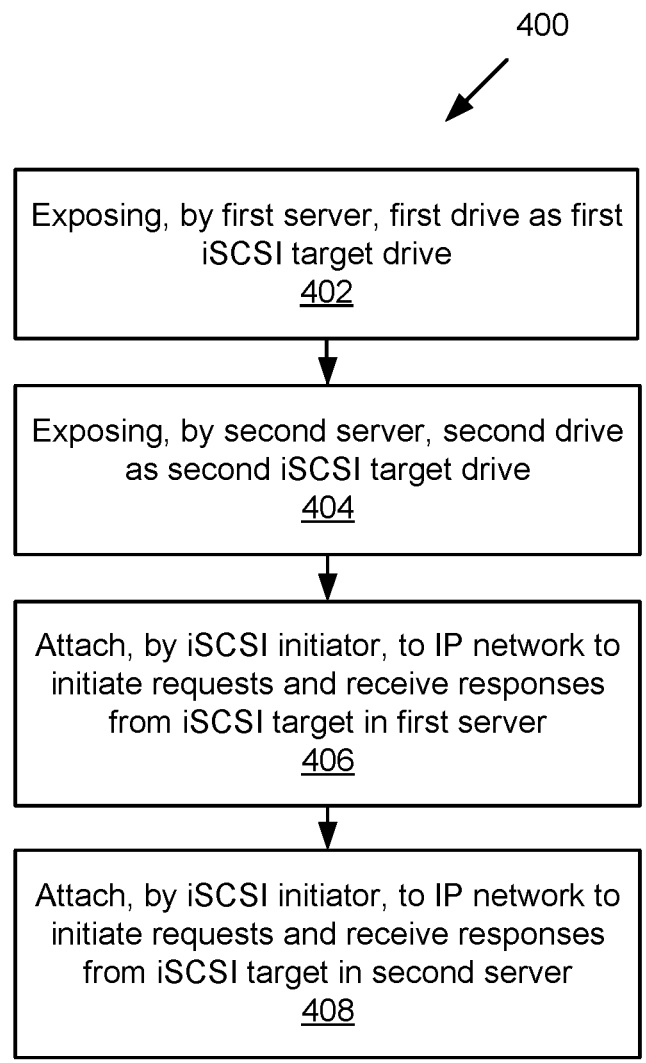
FIG. 4 illustrates a flowchart of an example method for exposing drives for management services when the drives are allocated to specific servers.

FIG. 4 illustrates a flowchart of a method for exposing SCSI drives for management services when the SCSI drives are allocated to specific servers. As described, the same storage stack which is meant for managing only directly attached devices can be configured to manage SCSI drives segregated by zoning and connectivity to the enclosure. The method 400 provides operations for allocating a specific SCSI drive to a server, and then exposing that allocated SCSI drive as an iSCSI drive that is accessible to a storage management node that interacts with the exposed SCSI drive as if the exposed SCSI drive is an iSCSI drive. Such exposure allows the storage management node to directly provide management services to the SCSI drive without having to have a dedicated port into each of the servers.

In a block 402, a first server 215.1 exposes a first SCSI drive 230.1.1 located in the zone 243.1 of the enclosure 240 and associated with the first server 215.1. The exposing of the first SCSI drive 230.1.1 is performed by an iSCSI target 235.1 located within the first server 215.1.

In a block 404, a second server 215.2 exposes a second SCSI drive 230.2.1 located in the zone 243.2 of the enclosure 240 and associated with the second server 215.2. The exposing of the second SCSI drive 230.2.1 is performed by an iSCSI target 235.2 located within the second server 215.2.

In a block 406, the iSCSI initiator 225 in the storage management node 205 attaches to the IP network 210 to initiate requests and receive responses from the iSCSI target 235.1 in the first server 215.1.

In a block 408, the iSCSI initiator 225 in the storage management node 205 attaches to the IP network 210 to initiate requests and receive responses from the iSCSI target 235.2 in the second server 215.2.

In operation, the iSCSI initiator (which may include an iSCSI initiator port for each iSCSI target) and each iSCSI target are given unique iSCSI names such as an iSCSI qualified name (IQN) or an extended-unique identifier (EUI). An iSCSI name represents a worldwide unique naming scheme. The iSCSI targets respond to iSCSI commands from the iSCSI initiator.

As described, the storage management node 205 hosting the iSCSI initiator 225 also includes the management stack 250. Accordingly, the management node may then engage with each of the SCSI drives 230 to perform management operations including performing maintenance routines, providing updates, and otherwise directly interacting with the iSCSI drives 230 that are variously allocated by zones in the enclosure 240 to dedicated servers, without requiring customization of software and processes on each of the servers.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), converged network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
an enclosure including:
a plurality of small computer system interface (SCSI) drives partitioned into a first zone including a first SCSI drive of the plurality of SCSI drives and a second zone including a second SCSI drive of the plurality of SCSI drives; and
a plurality of communication ports including:
a first port through which the first zone communicates; and
a second port through which the second zone communicates; and
a management node including an Internet SCSI (iSCSI) initiator configured to:
interact with the first SCSI drive in the enclosure through a first server providing a first iSCSI target to support a first iSCSI drive;
interact with the second SCSI drive in the enclosure through a second server providing a second iSCSI target to support a second iSCSI drive, wherein:
the iSCSI initiator is configured to engage with both the first iSCSI drive through the first iSCSI target in the first server and the second iSCSI drive through the second iSCSI target in the second server; and
the management node includes instances of:
the first SCSI drive accessible via the first iSCSI target in the first server; and
the second SCSI drive accessible via the second iSCSI target in the second server; and
execute, through a SCSI Generic Interface, management functions targeting the instances of the first SCSI drive and the second SCSI.

2. The system of claim 1, wherein:
the first server is configured to expose the first SCSI drive as the first iSCSI drive; and
the second server is configured to expose the second SCSI drive as the second iSCSI drive.

3. The system of claim 2, wherein:
the first and second SCSI drives are respectively physical SCSI drives to the first and second servers; and
the first and second SCSI drives are respectively iSCSI drives to the management node.

4. The system of claim 2, wherein:
the first server is further configured to communicate with the first SCSI drive over a first serially attached SCSI (SAS) port of the enclosure; and
the second server is further configured to communicate with the second SCSI drive over a second SAS port of the enclosure.

5. The system of claim 2, wherein:
the first and second SCSI drives are respectively physical SCSI drives to the first and second servers.

6. The system of claim 1, wherein a management module stack for managing the plurality of SCSI drives in the enclosure resides on the management node.

7. A computer-implemented method, comprising:
partitioning an enclosure of a plurality of small computer system interface (SCSI) drives into a first zone including a first SCSI drive of the plurality of SCSI drives and a second zone including a second SCSI drive of the plurality of SCSI drives;
communicating with the first and second zones through respective first and second ports;
interacting, from an Internet SCSI (iSCSI) initiator in a management node, with the first SCSI drive in the enclosure through a first server providing a first iSCSI target to support a first iSCSI drive;
interacting, from the iSCSI initiator, with the second SCSI drive in the enclosure through a second server providing a second iSCSI target to support a second iSCSI drive, wherein:
the iSCSI initiator is configured to engage with both the first iSCSI drive through the first iSCSI target in the first server and the second iSCSI drive through the second iSCSI target in the second server; and
the management node includes instances of:
the first SCSI drive accessible via the first iSCSI target in the first server; and
the second SCSI drive accessible via the second iSCSI target in the second server; and
executing, through a SCSI Generic Interface, management functions targeting the instances of the first SCSI drive and the second SCSI drive.

8. The computer-implemented method of claim 7, further comprising:
exposing by the first server the first SCSI drive as the first iSCSI drive; and
exposing by the second server the second SCSI drive as the second iSCSI drive.

9. The computer-implemented method of claim 8, wherein:
the first and second SCSI drives are respectively physical SCSI drives to the first and second servers; and
the first and second SCSI drives are respectively iSCSI drives to the management node.

10. The computer-implemented method of claim 8, further comprising:
communicating between the first server and the first SCSI drive over a first serially attached SCSI (SAS) port of the enclosure; and
communicating between the second server and the second SCSI drive over a second SAS port of the enclosure.

11. The computer-implemented method of claim 8, wherein:
the first and second SCSI drives are respectively physical SCSI drives to the first and second servers.

12. The computer-implemented method of claim 7, wherein a management module stack for managing the plurality of SCSI drives in the enclosure resides solely on the management node.

13. A system, comprising:
means for partitioning an enclosure of a plurality of small computer system interface (SCSI) drives into a first zone including a first SCSI drive of the plurality of SCSI drives and a second zone including a second SCSI drive of the plurality of SCSI drives;
means for communicating with the first and second zones through respective first and second ports;
means for interacting, from an Internet SCSI (iSCSI) initiator in a management node, with the first SCSI drive in the enclosure through a first server providing a first iSCSI target to support a first iSCSI drive;

means for interacting, from the iSCSI initiator, with the second SCSI drive in the enclosure through a second server providing a second iSCSI target to support a second iSCSI drive, wherein:
   the iSCSI initiator is configured to engage with both the first iSCSI drive through the first iSCSI target in the first server and the second iSCSI drive through the second iSCSI target in the second server; and
   the management node includes instances of:
      the first SCSI drive accessible via the first iSCSI target in the first server; and
      the second SCSI drive accessible via the second iSCSI target in the second server; and
means for executing, through an SCSI Generic Interface, management functions targeting the instances of the first SCSI drive and the second SCSI drive.

14. The system of claim 13, further comprising:
means for exposing by the first server the first SCSI drive as the first iSCSI drive; and
means for exposing by the second server the second SCSI drive as the second iSCSI drive.

15. The system of claim 14, wherein:
the first and second SCSI drives are respectively physical SCSI drives to the first and second servers; and
the first and second SCSI drives are respectively iSCSI drives to the management node.

16. The system of claim 14, further comprising:
means for communicating between the first server and the first SCSI drive over a first serially attached SCSI (SAS) port of the enclosure; and
means for communicating between the second server and the second SCSI drive over a second SAS port of the enclosure.

17. The system of claim 1, wherein the management node is further configured to instantiate the respective plurality of instances of the plurality of SCSI drives.

18. The system of claim 17, wherein the management node is further configured to initiate communications with the plurality of SCSI drives by communicating using SCSI commands over a network.

19. The system of claim 1, wherein the management node is further configured to download firmware updates to the first SCSI drive and the second SCSI drive through the SCSI Generic Interface.

20. The computer-implemented method of claim 7, further comprising:
   downloading, from the management node, firmware updates to the first SCSI drive and the second SCSI drive through the SCSI Generic Interface.

* * * * *